United States Patent [19]
Borchers et al.

[11] Patent Number: 4,874,811
[45] Date of Patent: Oct. 17, 1989

[54] ALKALINE AQUEOUS UNIVERSAL ADHESIVE CONTAINING POLY(METH-)ACRYLATE

[75] Inventors: Jürgen Borchers, Laatzen; Petra Bubolz, Garbsen, both of Fed. Rep. of Germany

[73] Assignee: Pelikan Aktiengesellschaft, Hanover, Fed. Rep. of Germany

[21] Appl. No.: 342,699

[22] Filed: Apr. 21, 1989

Related U.S. Application Data

[63] Continuation of Ser. No. 132,503, Dec. 14, 1987, abandoned.

[30] Foreign Application Priority Data

Dec. 12, 1986 [DE] Fed. Rep. of Germany ....... 3642498

[51] Int. Cl.$^4$ ............................................. C08L 39/00
[52] U.S. Cl. .................................. 524/516; 524/523; 525/378
[58] Field of Search ................. 524/516, 523; 525/378

[56] References Cited

U.S. PATENT DOCUMENTS 3,736,286  5/1973  Scott et al. .......................... 524/516
4,265,796  5/1981  Mueller-Mall et al. ............. 524/516

FOREIGN PATENT DOCUMENTS 0099139  8/1979  Japan ................................... 524/516

Primary Examiner—Joseph L. Schofer
Assistant Examiner—J. M. Reddick
Attorney, Agent, or Firm—Herbert Dubno

[57] ABSTRACT

An alkaline aqueous adhesive of a poly(meth-)acrylate base which contains poly(meth-)acrylate and polyvinylpyrollidone in a total amount of 5 to 40% by weight in the adhesive and in a weight ratio of 10:1 to 1:5. The poly(meth-)acrylate contains free carboxyl groups and has a degree of esterification of 0.55 to 0.9. The adhesive has a wide range of applications and can be transparent.

19 Claims, No Drawings

ALKALINE AQUEOUS UNIVERSAL ADHESIVE CONTAINING POLY(METH-)ACRYLATE

This is a continuation of application Ser. No. 07/132,503 filed on Dec. 14, 1987 now abandoned.

FIELD OF THE INVENTION

Our present invention relates to an aqueous alkaline universal adhesive based upon poly(meth-)acrylate and, more particularly, to a contact adhesive which bonds effectively to a variety of materials and can provide an extremely secure bond between two surfaces.

BACKGROUND OF THE INVENTION

An aqueous adhesive mixture with a poly(meth-)acrylate base is described in German Patent Document DE-OS No. 34 07 270. This adhesive is used in the production of a self-adhesive foil with which it is possible to protect sensitive surfaces, for example, lacquer-coated synthetic resin structural shapes during transport, storage and conditioning. The adhesive is available as a cloudy aqueous dispersion and cannot be used effectively to bond surfaces together regardless of the material from which they are constituted and thus can not be termed "universal adhesive". The term "universal adhesive" is used to refer to an adhesive which can be used to bond flexible or rigid, porous or nonporous, metallic, glass, wood, fabric, paper, leather and other materials together upon an application of the adhesive to one or both surfaces and then pressing of the surfaces together.

It is true that a "universal adhesive" as this term is used here cannot be used to bond every pair of materials together, since there are substrates or materials to be bonded to which the adhesive will not adhere and which will be repellant to or damaged by the adhesive. Nevertheless, there are enough substrates and materials with mutually different term is considered applicable. The "universal adhesive" is probably better described as a multipurpose adhesive, for this reason, but both terms may be used interchangeably here and we will continue to use the term "universal adhesive" because this term has received an art recognized significance for an adhesive capable of bonding many different materials to themselves and other materials.

Universal adhesives as have been provided heretofore contain high-molecular-weight compounds as the adhesive substance which can bond to many surfaces. Preferred high molecular weight compounds for this purpose heretofore have been nitrocellulose and polyvinylacetate. These materials are contained in solvent mixtures which might consist, for example, of esters and ketones and in many cases may also have significant proportions of alcohols.

The composition of the solvent and the solvent proportion are determined by the polymers used, the desired flowability (rheological) properties of the adhesive and the requisite bonding velocity. On certain synthetic resins or plastics, the solvent can have a solubilizing or attacking effect.

Typical of the substrates which may be bonded to or which may be bonded to another substrate are wood, paper, metal, leather and the like. Commercially available universal adhesives include UHU, PRITT and STABILIT universal adhesives.

As has already been indicated, these known universal adhesives contain high proportions of organic solvents. In general, this is a disadvantage because the solvents are environmentally hazardous and create dangerous and unhealthy conditions in the workplace. Frequently, the adhesives must be diluted or thinned with the organic solvent which thus must be handled even apart from the adhesives, or the solvent is evaporated at the workplace and the vapors may not be fully carried off in a safe or healthy manner.

There are, of course, known aqueous universal adhesives which avoid these drawbacks. However, in the presence of moisture the bonded adhesive tends to redisperse so that a permanent bond of the substrates joined together cannot exist, i.e. the bond may separate. In addition, the tensile and shear strengths of the adhesive bonds formed with these aqueous systems are generally not satisfactory.

Furthermore, in many cases it is desirable that the universal adhesives be transparent and this requirement is not fulfilled by most of the commercial aqueous universal adhesives currently available.

OBJECTS OF THE INVENTION

It is, therefore, the principal object of the present invention to provide an improved aqueous universal or multipurpose adhesive which does not employ volatile or organic solvents and has improved adhesive properties, especially with respect to permanent bonding of substrates together.

Another object of the invention is to provide an improved aqueous universal or multipurpose adhesive which is transparent when set.

DESCRIPTION OF THE INVENTION

These objects are attained, in accordance with the invention, which comprises an alkaline aqueous universal and poly(meth-)acrylate based adhesive which comprises 5 to 40% by weight of a mixture of poly(meth-)acrylate having free carboxyl groups and a degree of esterification of 0.55 to 0.9 and polyvinylpyrollidone in a weight ratio of substantially 10:1 to 1:5.

Where transparency is desired, both of these components, and thus the mixture of them are provided in solution in the aqueous medium. This also represents a best mode or preferred embodiment of the invention.

The invention provides a universal adhesive containing poly(meth-)acrylate esters which may be present in conjunction with nonesterified polyacrylates, both the esterified poly(meth-)acrylate and the nonesterified polyacrylate thus having free carboxyl groups which are important in the present invention to insure the solubility of the polymers to the desired degree in the aqueous system.

The degree of esterification should be between 0.55 and 0.9 and preferably between 0.65 and 0.85. If the upper value of 0.9 is exceeded, the solubility of polymer in the aqueous medium drops and it may not be possible to achieve the desired transparency. In addition, the adhesive effect is found to deviate from an optimum value. The latter applies also to an esterification degree of less then 0.55.

It should be noted that the HLB value plays a role in the use of the universal adhesive according to the invention and this is dependent upon the degree of esterification.

For the purposes of the invention, poly(meth-)acrylates which can be used can be produced by the usual polymerization reactions from the corresponding (meth-)acrylate esters and (meth-)acrylic acid in the desired ratios to obtain the requisite degree of esterification in the resulting polymers. The process as far copolymerizing methacrylic esters and acrylic acid are well known in the art and need not be described here.

The (meth-)acrylic acid esters which are used can be those in which (meth-)acrylic acid is esterified with lower alkyl and/or cycloalkyl alcohols. The lower alkyl groups of these alcohols can be methyl, ethyl, propyl, ispropyl, or butyl groups while the lower cycloalkyl alcohol can use the cycloalkyl group. The preferred esterifying alcohols, therefore, are methanol, ethanol, propanol, isopropanol, butanol or cyclohexanol.

The most preferred esterifying groups are the methyl, ethyl and isopropyl groups.

In the polymerization, we may make use of mixtures of such esters especially the methyl ester and the ethyl ester or the isopropyl ester.

The following commercial products have been found to be especially advantageous for use as the poly(meth-)acrylate component. In the molar ratios presented below, the molar ratios of the starting components for the polymer, i.e. the monomers, are given:

URAMEL 4020 (acrylic acid/acrylic acid methyl ester/acrylic acid ethyl ester terpolymer in a molar ratio of 14/10/21 and a molecular weight of 8,800).

PLEX 4980 (an acrylic acid/acrylic acid methyl ester/acrylic acid isobutyl ester terpolymer in a molar ratio of 4/9/14 and a molecular weight of about 9,800).

SETALIN AD 620 AC 45 (an acrylic acid/acrylic acid methyl ester/acrylic acid ethyl ester terpolymer with a molar ratio of 9/9/21 and a molecular weight of about 8,000).

It has been found to be advantageous to utilize low molecular-weight poly(meth-)acrylate as well as lower-molecular-weight polyvinylpyrollidone. The selection of the low-molecular-weight starting material permits the characteristics of the adhesive to be chosen as desired. The lower molecular weight compounds are more soluble and thus more capable of forming transparent adhesives.

The preferred molecular weight range for the poly(meth-)acrylate should be between 2,000 and 30,000, preferably between 4,000 and 12,000.

The polyvinylpyrollidone should have a preferred molecular weight range between 1,000 and 15000 especially between 2,000 and 12,000.

The weight ratio of the poly(meth-)acrylate to the polyvinylpyrollidone is also important to the adhesive bonding characteristics which depend upon the chemical transaction of these components. The weight ratio of poly(meth-)acrylate to polyvinylpyrollidone is, as noted, between 10:1 and 1:5, the preferred ratio being 5:1 to 1:1. The total quantity of these two components in the adhesive of the invention is also important and should range between 5 and 40% by weight.

When the adhesive of the invention is to be transparent there are a number of possibilities which may be employed.

The polyvinylpyrollidone as such has good solubility in water. This is not the case for the poly(meth-)acrylate which should be brought into solution in an aqueous alkali medium. The two aqueous solutions can then be mixed together and together can form a clear aqueous adhesive.

Furthermore, one can omit the step of dissolving the polyvinylpyrollidone in an aqueous medium before the two components are mixed and can simply add the solid polyvinyl-pyrollidone directly to the aqueous poly(meth-)acrylate solutions. Also, both components in solid form can be simultaneously stirred into an alkali medium.

Preferably, however, a commercial aqueous poly(meth-)acrylate dispersion is used, is rendered alkaline and has the polyvinylpyrrolidone in aqueous medium or in solid form added thereto. To form the alkali medium, any available alkali may be used, e.g. sodium hydroxide or potassium hydroxide or ammonia hydroxide. In the best mode embodiment of the invention aqueous ammonia is used. The aqueous ammonia has been found to give rise to an especially hard-permanent adhesive bond. Apparently, ammonia is evaporated from the adhesive during the bonding process to bring about an irreversible formation of the adhesive bond which is susceptible to redispersion even in the presence of moisture. This advantage also applies to a variety of low bonding amines which can be substituted for all used in conjunction with the ammonia, although from the point of view of avoiding environmental pollution and health dangers at the workplace, we prefer to exclude such amines.

Other additives can be supplied to the universal adhesive of the invention to improve or generate certain desirable properties or characteristics of the adhesive. For example, when the adhesive is to be flexible or applied to flexible substrates, cycloalkylalcohols, especially glycerine and glycols can be added to provide a certain flexibility to the film and prevent the formation of corrugations in, for example, the bonding of paper. Such corrugation formation can thus be reduced to a negligible level.

The degree to which alkalinity is raised in the solutions for dissolving the poly(meth-)acrylate can be selected as desired for the results required. In other words no specific pH need be defined and indeed the pH is not critical as long as the solution is alkaline. It may be noted that the alkalinity should be sufficient, i.e. the pH should be sufficiently high, that at least the preponderance of the poly(meth-)acrylate component goes into solutions, i.e. the carboxylic acid groups are transformed into carboxylates. Preferably, however, all of the poly(meth-)acrylate components should be brought into solution.

The carboxylate groups of the poly(meth-)acrylate are the solubility determining groups thereof. An excessive alkalinity should, however, be avoided because with excessive alkalinity, there may be a reduction in the solubility of the polyvinylpyrollidone and thus an undesired increase in viscosity.

For good flexibility, therefore, the pH value should not exceed about 10 and for the maximum versatility in bonding to various substrates, the pH should be advantageously between about 8.5 and 9.

The advantages of the adhesive of the invention have already been alluded to. Firstly, the product is a highly versatile universal adhesive which is apparent for paper, photographs and substantially all other porous substrates, metals and even glass. It has been found to be effective as well for polystyrene, e.g. commercial products mistaken under the name STYROPOR which have been found to be problematical materials for other adhesives.

While the adhesive has high bond strength, it maintains the tacky or bonding ability and pot life for relatively long periods of time which is advantageous for the bonding of large area articles. The tensile strength on bonding to wood can reach about 700 N/cm$^2$ and with glass up to about 110 N/cm$^2$. The transparency of the adhesive can be insured by elevating the pH well above neutral and/or reducing the polyacrylate content within the limits described.

EXAMPLE 1

1.8 parts by weight of a 20% aqueous ammonia solution is added to 45.2 parts by weight water. To this aqueous medium 5 parts by weight of 40% aqueous poly(meth-)acrylate dispersion (commercial designation URAMUL 4020 of the firm Scado GmbH) are added. The mixture is stirred at room temperature until a clear solution resolves. Then about 10.5 parts by weight of a commercial polyvinylpyrollidone (commercial designation LUVISKOL K80 powder from BASF) are added with stirring. After the powder has been fully dissolved, a clear solution is available which is coated onto wood and glass substrates and the adhesive bond characteristics are detailed. Tests are carried out for tensile and shear strength.

In the gluing of wood the tensile strength test was carried out by forming 2 wood strips in "T" shape with dimensions of 2×10 cm. Both strips are coated with the adhesive and permitted to partially dry to a tacky state. The coated surfaces are then pressed together. The strips are clamped for an hour with a clamping force of one kg and the bond is then permitted to set for 16 hours. The tensile strength of the bond was found to be 389 N/cm$^2$. The shear strength was determined by gluing two glass strips of "T" shape and similar dimensions together The 2 cm edge was coated with the adhesive in a thick coating and pressed against a 10 cm edge of the other strip so that a bead was formed from the adhesive. After a drying time of 16 hours, the shear strength was found to be 113 N/cm$^2$.

EXAMPLE 2

2.9 parts by weight of 20% aqueous ammonia, 37.1 parts by weight water, 14.3 parts by weight of 20% aqueous polyvinylpyrollidone (LUVISTOL KPO of BASF) and 45.7 parts by weight of 45 % aqueous poly(meth-)acrylate solutions (SETALIN AD 620 AQ 45 from Synthese v.B.) are mixed together with stirring until a clear solution results.

The clear solution is then used in adhesive tests as in Example 1 and, in the gluing of wood, had a tensile strength of 607 N/cm$^2$ and for the gluing of glass a shear strength of 9 N/cm$^2$.

EXAMPLE 3

9.5 parts by weight water, 0.5 parts by weight of 20% aqueous ammonia, 80 parts by weight of a 20% aqueous polyvinylpyrollidone solution (LUVISKOL K80 from BASF) and 10 parts by weight of a 40% aqueous polyacrylate solution (PLEX 4980D from ROHM GmbH) are mixed with stirring to form a clear solution.

Once the clear solution is formed, it is subjected to the adhesive bonding tests described in Example 1. In the gluing of wood, the adhesive is found to have a tensile strength of 461 N/cm$^2$ and with glass the shear strength was found to be 44 N/cm$^2$.

EXAMPLE 4 (COMPARATIVE EXAMPLE)

The universal adhesive produced in Example 2 is compared with a known good commercial product utilizing a solvent (solvent=a mixture of 79% methylacetate, 15% ethanol and 6% methanol), the adhesive component being polyvinylacetate. Various types of paper and wood are glued together and the ahesive strength tests of Example 1 are used.

With paper and wood the results were comparable. With the bonding of glass and metal, tensile strengths with universal adhesive of the invention of 160 and 190 cm$_2$ were obtained by comparison with values 80 and 40 N/cm$_2$ with the commercial adhesive. The universal adhesive of the invention was able to glue pieces of STYROPOR together and the commercial adhesive was not effective for this purpose.

We claim:

1. An alkali aqueous universal poly(meth-)acrylate based adhesive which consists essentially of an aqueous solution of 5 to 40% by weight of a mixture of a poly(meth-)acrylate having a free carboxyl group and a degree of esterification of 0.55 to 0.85 and polyvinylpyrollidone in a weight ratio of 10:1 to 1:5.

2. The adhesive defined in claim 1 wherein said poly (meth-)acrylate is a low-molecular-weight poly(meth-)acrylate.

3. The adhesive defined in claim 1 wherein said polyvinyl pyrollidone is a low-molecular-weight polyvinylpyrollidone.

4. The adhesive defined in claim 1 wherein said poly (meth-)acrylate is a low-molecular-weight poly(meth-)acrylate and said polyvinylpyrollidone is a low-molecular-weight polyvinylpyrollidone.

5. The adhesive defined in claim 4 wherein said poly(meth-)acrylate has a molecular weight between 2,000 and 30,000.

6. The adhesive defined in claim 5 wherein said poly(meth-)acrylate has a molecular weight between 4,000 and 12,000.

7. The adhesive defined in claim 6 wherein said polyvinylpyrollidone has a molecular weight between 1,000 and 15,000.

8. The adhesive defined in claim 7 wherein said polyvinylpyrollidone has a molecular weight between 2,000 and 12,000.

9. The adhesive defined in claim 8 wherein the degree of esterification of said poly(meth-)acrylate is between 0.65 and 0.85.

10. The adhesive defined in claim 1 wherein said adhesive is transparent.

11. An alkaline aqueous universal poly(meth-)acrylate based adhesive which consists essentially of a solution of 5 to 40% by weight of a mixture of a poly(meth-)acrylate having a free carboxyl group and a degree of esterification of 0.55 to 0.85 and polyvinylpyrollidone in a weight ratio of 10:1 to 1:5 , and ammonia in an effective amount to provide a hard-permanent adhesive bond.

12. The adhesive defined claim 11 wherein the weight ratio of said poly(meth-)acrylate to said polyvinylpyrollidone is 5:1 to 1:1 and the total amount of the mixture of poly(meth-)acrylate and polyvinylpyrollidone in the adhesive is 20 to 30 % by weight.

13. The adhesive defined in claim 12 wherein the poly(meth-)acrylate is esterified with at least one alcohol selected from the group which consists of lower alkylalcohols and cycloalkylalcohols.

14. The adhesive defined in claim 13 wherein said alcohol is selected from the group which consists of methanol, ethanol, propanol, isopropanol, butanols and cyclohexanol.

15. The adhesive defined in claim 14 which consists essentially of:
- 45.2 parts by weight water to which 1.8 parts by weight of 20% aqueous ammonia has been added,
- 5 parts by weight of a 40% aqueous poly(meth-)acrylate solution, and 10.5 parts by weight of polyvinylpyrrolidone.

16. The adhesive defined in claim 14 which consists essentially of:
- 37.1 parts by weight water to which 2.9 parts by weight of 20% aqueous ammonia has been added,
- 45.7 parts by weight of a 45% aqueous poly(meth-)acrylate solution, and
- 14.3 parts by weight of a 20% aqueous solution of polyvinylpyrrolidone.

17. The adhesive defined in claim 14 which consists essentially of:
- 9.5 parts by weight water to which 0.5 parts by weight of 20% aqueous ammonia has been added,
- 10 parts by weight of a 40% aqueous poly(meth-)acrylate solution, and
- 80 parts by weight of a 20% aqueous solution of polyvinylpyrrollidone.

18. The adhesive defined in claim 14 wherein said poly(meth-)acrylate is provided in a polymeric acrylate reaction product of acrylic acid/acrylic acid methyl ester/acrylic acid ethyl ester in a molar ratio of 14/10/21 and a molecular weight of about 8,800, acrylic acid/acrylic acid methyl ester/acrylic acid isobutyl ester in a molar ratio of 4/9/14 and a molecular weight of about 9,800, or acrylic acid/acrylic acid methyl ester/acrylic acid ethyl ester in a molar ratio of 9/9/21 and a molecular weight of about 8,000.

19. The adhesive defined in claim 14 wherein said poly(meth-)acrylate is provided in a polymeric acrylate reaction product of acrylic acid and at least one ester of acrylic acid.

* * * * *